Dec. 9, 1969     L. E. COOPER     3,482,749
SPARE TIRE MOUNTING RACK
Filed Feb. 28, 1968
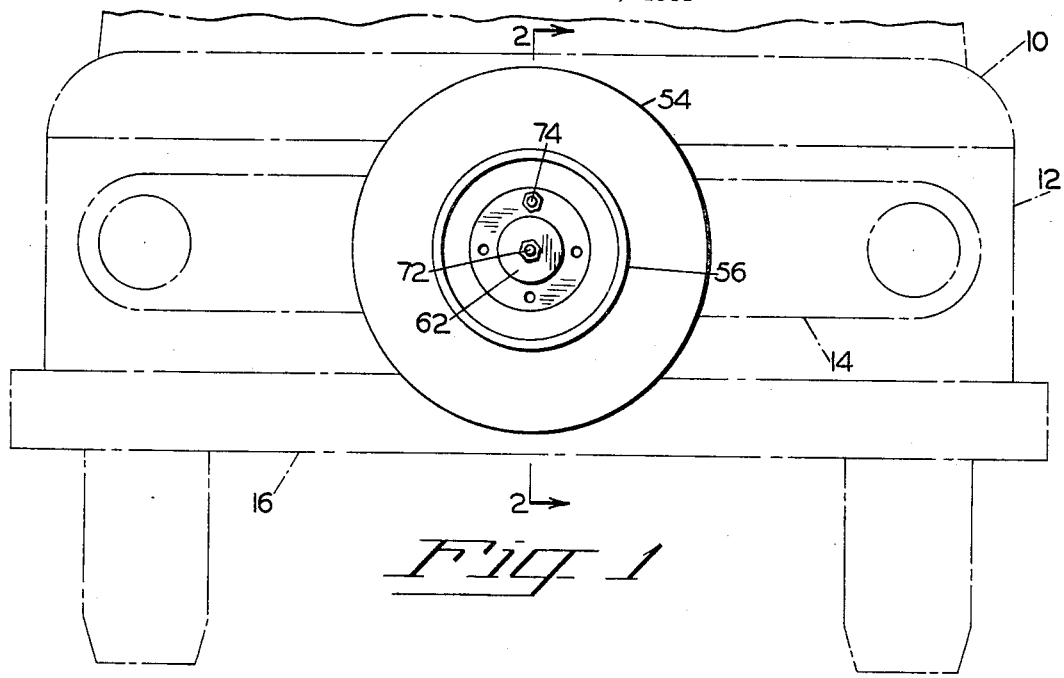
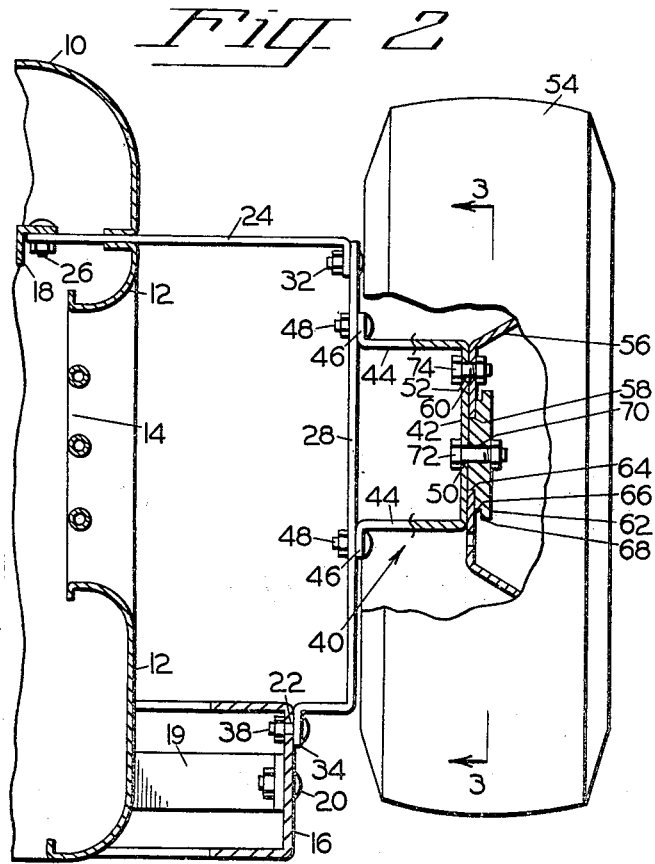
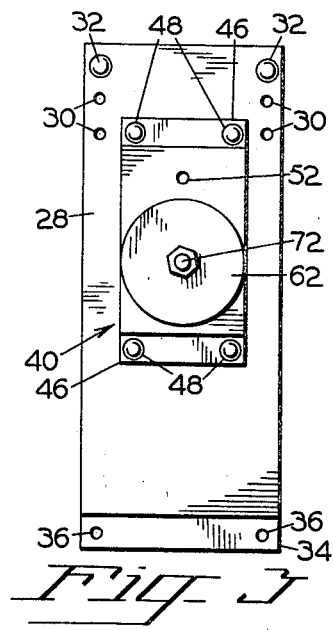
INVENTOR.
LESTER E. COOPER
BY *Eugene D. Farley*
ATTY.

United States Patent Office 3,482,749
Patented Dec. 9, 1969

3,482,749
SPARE TIRE MOUNTING RACK
Lester E. Cooper, 4603 Apple Ave.,
Olympia, Wash. 98501
Filed Feb. 28, 1968, Ser. No. 709,039
Int. Cl. B60r 9/00, 19/02; B62d 43/02
U.S. Cl. 224—42.04
3 Claims

ABSTRACT OF THE DISCLOSURE

A rack for mounting a spare tire-wheel assembly on the front end of a truck comprises a horizontal plate, the inner end of which is secured to a truck frame member. A vertical plate has one of its ends secured to the outer end of the horizontal plate and its lower end secured to the truck bumper. The vertical plate mounts a forwardly projecting U-shaped bracket dimensioned to nest within the tire assembly when the latter is in its mounted position. A mounting block and bolt releasably attaches the tire assembly to the bracket.

---

This invention pertains to racks for mounting spare tire-wheel assemblies. It pertains particularly to a rack for use in mounting a spare tire-wheel assembly on the front end of a pick-up truck.

It is present practice to mount the spare tire of pickup trucks horizontally at the rear of the truck underneath the truck box, where it is difficult of access and where it accumulates a large amount of mud and other debris.

It is the general object of the present invention to provide a rack for mounting a pickup truck spare tire assembly on the front of the truck where it is accessible, easy to use, safe and reliable.

It is a further object of this invention to provide a rack for mounting a pickup truck spare tire assembly which holds the assembly snugly against the front of the car, which supports the weight of the tire efficiently, which holds the tire so that it can not spin nor move while it is mounted on the rack, and which may be applied to pick-up trucks without substantial modification of the truck structure.

In the drawings:

FIG. 1 is a view in front elevation of a elevation of a pickup truck illustrating the manner of mounting the spare tire thereon, using the presently described rack;

FIG. 2 is a transverse sectional view taken along line 2—2 of FIG. 1 and illustrating the construction of the rack; and FIG. 3 is a view in front elevation of the rack, looking in the direction of the arrows 3—3 of FIG. 2.

Generally stated, the spare tire mounting rack of my invention comprises a horizontal plate having its inner end attached to the truck. A vertical plate has its upper end attached to the horizontal plate and its lower end attached to the truck bumper. A U-shaped bracket is fixed to the front face of the vertical plate. It extends forwardly into the central tire opening, where it is secured to the wheel, thereby supporting both the wheel and the tire mounted thereon.

Considering the foregoing in greater detail and with par ticular reference to the drawings:

The spare tire mounting rack of my invention is adapted for use in mounting a spare tire assembly in the front of a conventional pickup truck. As is usual, the front end of the truck includes a hood 10, a grill support panel 12, a grill 14, and a bumper 16. It also includes a horizontal angle iron or other frame member 18 which may be employed to support the radiator and which is located on a plane above the plane of the bumper.

The bumper is fastened to side bars 19 by means of bolts 20. For the purposes of the present invention, the central portion of the bumper is provided with transverse openings 22 which may comprise the bolt holes normally provided for bolting the license plate to the bumper.

The presently described tire mounting rack may be mounted on the structure thus provided without any modification whatsoever.

To this end there is provided a horizontal plate 24. The inner end of the plate is dimensioned for insertion in the space normally provided between hood 10 and grill-mounting panel 12. It is secured to frame member 18 by means of bolts 26. A pair of parallel bars may be used in place of plate 24, if desired.

The outer end of plate 24 projects forwardly of the truck to a position slightly ahead of bumper 16.

Cooperating with horizontal plate 24 is a vertical plate 28. The upper end of this plate is provided with a plurality of openings 30 by means of which it may be bolted to the outer end of horizontal plate 24, using bolts 32. Selected ones of the openings may be used for this purpose, as required by the size of the installation.

The lower end of vertical plate 28 is formed with an inwardly offset section 34. It also is provided with bolt holes 36 by means of which it may be bolted to the face of bumper 16, using bolts 38.

A U-shaped bracket, indicated generally at 40, is mounted on vertical plate 28. The bracket is comprised of a central segment 42, a pair of side segments 44, and outwardly extending feet 46. It nests in the space within the tire and is fastened to vertical plate 28 by means of bolts 48.

The central segment 42 of the bracket is formed with a central opening 50 and a marginal opening 52. It supports the spare tire assembly including tire 54 mounted in the usual manner on a rim-equipped wheel 56. The latter in turn has the usual large central opening 58 and radially spaced mounting bolt holes 60.

To assist in mounting the tire assembly on bracket 40, there is provided a novel block 62. This is a round element fabricated from metal or other strong structural material. As shown in FIG. 2, it is of terraced construction, being provided with a first section 64 dimensioned to seat in opening 58 of the wheel, a second section 66 dimensioned to seat in an opening of larger diameter (thereby making the block universal in its application), and a third section 68 of still greater diameter. A transverse opening 70 extends completely through the block, centrally thereof.

In the mounted position of the tire assembly, section 64 of the block (or section 66, as the case may be) fits snugly within wheel opening 58 with the adjacent section serving as a flange which overlies and bears against the outer surface of the wheel.

Also, central opening 70 of the block registers with central opening 50 of bracket 40 while one of the bolt holes 60 of the wheel registers with marginal opening 52 of the bracket.

Accordingly, the elements may be secured together releasably by means of a first bolt 72 which holds block 62 in washer-like clamping engagement against the wheel, securing the tire assembly firmly in place. Further to support the tire assembly, and also to prevent it from spinning or rotating, there is provided a second bolt 74 which penetrates the aligned wheel opening 60 and bracket opening 52.

In use, it is a simple matter to lift the spare tire assembly to its mounted position, align the appropriate openings, and insert and tighten bolts 72, 74. When thus mounted, the assembly is out of the way but readily accessible. It is not subject to an accumulation of dirt and debris as it would be if it were mounted on the underside of the truck box, as heretofore. It is held securely so that it can not rattle nor shift its position. When it is desired to demount the tire, it is merely necessary to release bolts 72, 74.

It is to be understood that the form of my invention herein shown and described is to be taken as an illustrative example of the same and that various changes in the shape, size and arrangement of parts may be resorted to without departing from the spirit of my invention.

Having thus described my invention, I claim:

1. A rack for mounting a spare tire-wheel assembly on the front end of a truck, the wheel being provided with a central opening and at least one mounting bolt hole radially spaced therefrom, the front end of the truck including a support frame member and a bumper positioned below the support frame member, the rack comprising:
   (a) a horizontal plate,
   (b) securing means securing the inner end of the plate to the frame member,
   (c) a vertical plate having a front face,
   (d) securing means securing the upper end of the vertical plate to the outer end of the horizontal plate and the lower end of the vertical plate to the bumper,
   (e) a substantially U-shaped bracket having a length less than the internal diameter of the tire and having through its central segment a marginal hole and a central opening,
   (f) securing means securing the bracket to the front face of the vertical plate,
   (g) the bracket nesting inside the tire with its front face abutting the wheel, its central opening registering with the central opening of the wheel and its marginal hole registering with the bolt hole of the wheel,
   (h) a centrally apertured support block seated in the central wheel opening in bearing engagement with the wheel and
   (i) bolt means penetrating the aligned block aperture and bracket central opening and mounting the assembly on the bracket.

2. The rack of claim 1 wherein the block is flanged and arranged with the flange overlying and bearing against the face of the wheel when the tire-wheel is in mounted position.

3. The rack of claim 1 wherein the marginal hole is aligned with one of the mounting bolt holes of the wheel, and bolt means penetrating the aligned holes and securing the assembly to the bracket.

References Cited

UNITED STATES PATENTS

| | | |
|---|---|---|
| 1,929,679 | 10/1933 | Duncan. |
| 1,965,735 | 7/1934 | Dayes _____ 224—42.24 |
| 2,709,545 | 5/1955 | Cryer _____ 224—42.06 XR |
| 3,330,455 | 7/1967 | Cooper _____ 224—42.06 |
| 3,425,605 | 2/1969 | Triboulet _____ 224—42.06 |

GERALD M. FORLENZA, Primary Examiner

U.S. Cl. X.R.

224—42.06, 42.24